(12) United States Patent
Wood (10) Patent No.: US 6,683,310 B2
(45) Date of Patent: Jan. 27, 2004

(54) READOUT TECHNIQUE FOR MICROBOLOMETER ARRAY

(75) Inventor: Roland A. Wood, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 159 days.

(21) Appl. No.: 09/883,796

(22) Filed: Jun. 18, 2001

(65) Prior Publication Data

US 2002/0190208 A1 Dec. 19, 2002

(51) Int. Cl.$^7$ .............................. G01J 5/10; H01L 27/14
(52) U.S. Cl. ..................................... 250/338.1; 250/330
(58) Field of Search ............................... 250/338.1, 330, 250/332, 338.4, 339.04, 339.09, 370.08, 252.1, 342

(56) References Cited

U.S. PATENT DOCUMENTS

| | | | |
|---|---|---|---|
| 4,752,694 A | 6/1988 | Hegel, Jr. et al. ............ 250/578 |
| 4,922,116 A | 5/1990 | Grinberg et al. ......... 250/495.1 |
| 5,010,251 A | 4/1991 | Grinberg et al. ............ 250/332 |
| 5,196,703 A | 3/1993 | Keenan ....................... 250/332 |
| 5,288,649 A | 2/1994 | Keenan ........................... 437/3 |
| 5,300,915 A | 4/1994 | Higashi et al. ............ 338/22 R |
| 5,420,419 A | * 5/1995 | Wood ....................... 250/338.4 |
| 5,698,852 A | 12/1997 | Tanaka et al. ............... 250/332 |
| 5,756,999 A | * 5/1998 | Parrish et al. ............... 250/332 |
| 5,777,329 A | 7/1998 | Westphal et al. ....... 250/339.02 |
| 5,811,808 A | * 9/1998 | Cannata et al. ............. 250/332 |
| 6,028,309 A | * 2/2000 | Parrish et al. ............... 250/332 |
| 6,064,066 A | 5/2000 | Bevan et al. ................ 250/345 |
| 6,274,869 B1 | * 8/2001 | Butler ....................... 250/338.1 |
| 6,465,785 B1 | * 10/2002 | McManus ................ 250/338.1 |
| 6,476,392 B1 | * 11/2002 | Kaufman et al. ........... 250/332 |

FOREIGN PATENT DOCUMENTS

| | | | | |
|---|---|---|---|---|
| EP | 601534 A | 6/1994 | ............ H04N/5/33 |
| GB | 2125217 A | 2/1984 | ............ H01L/31/02 |
| WO | 97/01926 | 1/1997 | ............ H04N/5/33 |
| WO | 97/08753 | 3/1997 | ............ H01L/27/16 |

\* cited by examiner

*Primary Examiner*—Constantine Hannaher
*Assistant Examiner*—Otilia Gabor
(74) *Attorney, Agent, or Firm*—Kris T. Fredrick (57) ABSTRACT

A method and apparatus to reduce undesirable deficiencies in an image produced by a microbolometer array including multiple smaller arrays includes applying a separate bias pulse to each of the microbolometers in the smaller arrays and measuring a resulting signal corresponding to the applied bias pulse for each of the microbolometers using multiple measurement circuits associated with the smaller arrays during the frame time. Further, one or more known bias pulses are applied to the measurement circuitry during the frame time, one or more resulting calibration signals are measured, an offset parameter for each of the smaller arrays based on the corresponding measured resulting calibration signals is computed, and the measured resulting signal is corrected using the associated computed offset parameter to produce an output signal that reduces the undesirable deficiencies in the image produced by the array.

54 Claims, 4 Drawing Sheets

READOUT TECHNIQUE FOR MICROBOLOMETER ARRAY

FIELD OF THE INVENTION

This invention relates generally to a microbolometer focal plane array, and more particularly pertains to an improved readout technique for the microbolometer array.

BACKGROUND

Thermal infrared detectors are detectors, which operate by sensing the heating effect of infrared radiation. Thermal detectors generally do not need to be cooled below room temperature, which gives them an important practical advantage. Thermal infrared detectors that operate at room temperature have been known for 200 years, but recently the availability of integrated circuit and micromachining technology has greatly increased interest in this field. It is now practical to manufacture an array containing many thousands of thermal infrared detectors, which operates well at room temperature.

A bolometer is a thermal radiation detector that operates by absorbing incident electromagnetic radiation (typically infrared radiation), converting the absorbed infrared energy into heat, and then indicating the resulting temperature change in the detector by a change in its electrical resistance, which is a function of temperature. A microbolometer is a small bolometer, typically a few tens of microns in lateral size. Microbolometer infrared imaging systems are typically designed to be sensitive to long-wave infrared, typically in a wavelength range of about 8–12 micrometers. A two-dimensional array of such microbolometers, typically 120× 160 microbolometers, can detect variations in the amount of radiation emitted from objects within its field of view and can form two-dimensional images therefrom. A typical array can have more than 80,000 microbolometers. Linear arrays of microbolometers may similarly be formed to form line images. In such large arrays of microbolometers, it is necessary to measure the resistance of all of the individual microbolometers in the array without compromising the signal to noise ratio of the microbolometers. Because it is impractical to attach thousands of electrical wires to such an array to measure all the microbolometer electrical resistances in the array, microbolometer arrays are typically built on a monolithic silicon called a "read out integrated circuit" (ROIC) which is designed to measure all the individual microbolometer electrical resistances in the array in a short time, called the "frame time." The term "frame time" refers to a time in which a microbolometer array produces each complete picture or image of an object being viewed. The frame time is typically around $\frac{1}{30}^{th}$ of a second, but it can be faster or slower than the typical time of $\frac{1}{30}^{th}$ of a second. In order to allow the microbolometer array to respond adequately to time-dependent changes in the detected infrared radiation, the thermal response time of each microbolometer is typically adjusted, by power design, to be about the same value as the frame time.

A typical method used by the ROIC to measure the electrical resistance of all the microbolometers in the array is to apply a "bias pulse" of electrical voltage (or current) to each microbolometer in the array, and to measure a resulting signal current (or voltage). It is more common to apply a voltage bias pulse to each microbolometer in the array and to measure a resulting current signal from each microbolometer in the array during each frame time. In large arrays such as the one included in the ROICs, it is usual to apply such bias pulses to more than one microbolometer simultaneously, and to measure the resulting signal currents simultaneously. However, it becomes difficult to read each of the microbolometers in the array within the frame time. Therefore, it is advantageous to divide such large arrays into several smaller arrays to ease the reading process of large arrays. In such cases, each smaller array would be readout as if it were a separate array using its own data readout port and feeding data to a corresponding measurement circuit associated with each smaller array. The division of the large arrays need not be a physical division.

However, such a scheme of dividing the array into smaller arrays with each smaller array having its own measurement circuit to ease the reading of the larger array can produce undesirable deficiencies in the produced image. This is generally due to different drifts in the output signals of the smaller arrays induced by changes in different measurement circuit characteristics, such as offset voltage, offset current, and gain.

Therefore, there is a need in the art to design and operate a large array including multiple smaller arrays having their own data readout ports such that they do not produce the undesirable pattern artifacts in the produced image due to drifts in measurement circuits associated with each of the smaller arrays.

SUMMARY OF THE INVENTION

The present invention provides a technique to reduce undesirable pattern artifacts in an image produced by a microbolometer array including multiple smaller arrays. In one aspect of the present invention, this is accomplished by applying a bias pulse to each of the microbolometers in the multiple smaller arrays and measuring a resulting signal corresponding to the applied bias pulse for each of the microbolometers using multiple measurement circuits associated with the multiple smaller arrays during the frame time. Further, the technique requires applying one or more known bias pulses (calibration signals) to the multiple measurement circuitry associated with the smaller arrays during the frame time and measuring one or more resulting calibration signals corresponding to the applied one or more known bias pulses. Thereafter the technique requires computing an offset parameter for each of the multiple smaller arrays based on the corresponding measured one or more resulting calibration signals and correcting the measured resulting signal using the associated computed offset parameter to produce an output signal that significantly reduces the undesirable pattern artifact in the image.

Another aspect of the present invention provides a technique for reading out a large microbolometer array including multiple groups of microbolometers comprises using multiple measuring circuits to readout each of the groups of microbolometers. This is accomplished by applying a bias pulse during a frame time to each of the microbolometers in the group of microbolometers. The technique then includes measuring a resulting signal corresponding to the applied bias pulse during the frame time for each of the microbolometers in the groups of microbolometers using multiple measurement circuitry associated with each of the smaller arrays. Then the technique includes applying one or more calibration bias pulses during the frame time to the measuring circuitry associated with each of the groups of microbolometers. Further, the technique includes measuring one or more resulting calibration signals corresponding to the applied calibration bias pulses during the frame time. Thereafter the technique includes computing correction parameters for each of the groups of microbolometers and correcting the measuring resulting signal using associated computed correction parameters to produce an output signal that substantially reduces the undesirable image defects in the produced image.

Another aspect of the present invention is an infrared radiation detector apparatus for reducing undesirable deficiencies in an image produced by a microbolometer array including multiple smaller arrays. The infrared radiation detector apparatus comprises a microbolometer array including multiple smaller microbolometer arrays. The apparatus further includes a first timing circuit coupled to the array to apply a bias pulse to each of the microbolometers in the smaller arrays during a frame time. The apparatus also includes multiple measurement circuits coupled to the corresponding smaller arrays to measure resulting signals associated with each of the applied bias pulses during the frame time. Also included in the apparatus are multiple calibration circuits coupled to the corresponding measurement circuits. A second timing circuit coupled to the calibration circuits applies one or more calibration bias pulses during the frame time to each of the measurement circuits. Then the measurement circuits measure one or more resulting calibration signals corresponding to the applied one or more calibration bias pulses. The measurement circuits then compute correction parameters for each of the smaller arrays based on each of the measured one or more resulting calibration signals. The measurement circuits further apply each of the computed correction parameters to the measured resulting signal to produce an output signal that reduces undesirable deficiencies in the image produced by the microbolometer array.

Another aspect of the present invention is an infrared radiation detector apparatus for reducing undesirable pattern noise in an image produced by the microbolometer array including groups of microbolometers. The infrared radiation detector apparatus comprises a microbolometer array including groups of microbolometers. The apparatus further comprises a first timing circuit coupled to the array to apply a bias pulse to each of the microbolometers in the groups of microbolometers during a frame time. The apparatus also includes multiple measuring circuits coupled to the corresponding multiple groups of microbolometers to measure resulting signals associated with each of the applied bias pulses during the frame time. The apparatus further includes multiple calibration circuits coupled to the associated multiple measuring circuits. A second timing circuit is coupled to the multiple calibration circuits to apply one or more calibration bias pulses during the frame time to each of the multiple measuring circuits. The measuring circuits produce one or more resulting calibration signals corresponding to the applied one or more known bias pulses. A computing circuit coupled to the multiple measuring circuits compute offset and gain parameters and further applies the computed offset and gain parameters to the measured resulting signals associated with each of the multiple measuring circuits to produce an output signal that reduces undesirable pattern noise in the image produced by the microbolometer array.

Other aspects of the invention will be apparent on reading the following detailed description of the invention and viewing the drawings that form a part thereof.

DETAILED DESCRIPTION

This document describes a technique to reduce undesirable deficiencies in an image reduced by a microbolometer array including multiple smaller arrays coupled to respective multiple measurement circuits.

Figure 1:
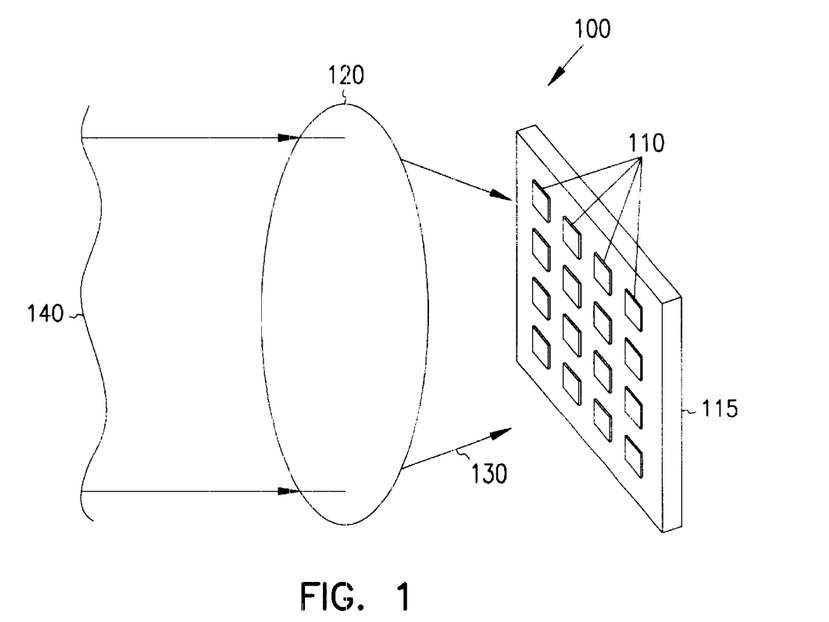
FIG. 1 illustrates the use of a microbolometer array in an imaging system.

FIG. 1 illustrates one embodiment of using a microbolometer array 110 in an imaging system 100. The imaging system 100 further includes an infrared-transmitting lens 120. The array 110 can be a one or two-dimensional array. The array 110 is formed on a monolithic silicon read out integrated circuit (ROIC) 115. In the embodiment shown in FIG. 1, the array 110 is disposed in the focal plane of the infrared-transmitting lens 120, such that the rays of infrared radiation 130 are focused onto the focal plane to produce an image of a distant object or scene 140, in the same way that a photographic film produces an image when placed in the focal plane of a camera lens. The heating effect of the focused image causes temperature changes in individual microbolometers in the array 110. This temperature change in each of the microbolometers induces a change in resistance value in each of the microbolometers in the array 110. The ROIC 115 interrogates each microbolometer in the array 110 to measure the change in resistance in each of the microbolometers in the array 110. The change in resistance in each of the microbolometers is measured within a frame time. Generally, the frame time is around $\frac{1}{30}^{th}$ of a second. The thermal response time of each microbolometer in the array is generally tailored to be approximately equal to the frame time. The above-indicated measurement of the change in resistance in each of the microbolometers is repeated every frame time so that a real-time image of the scene and/or object 140 being viewed is displayed.

Figure 2:
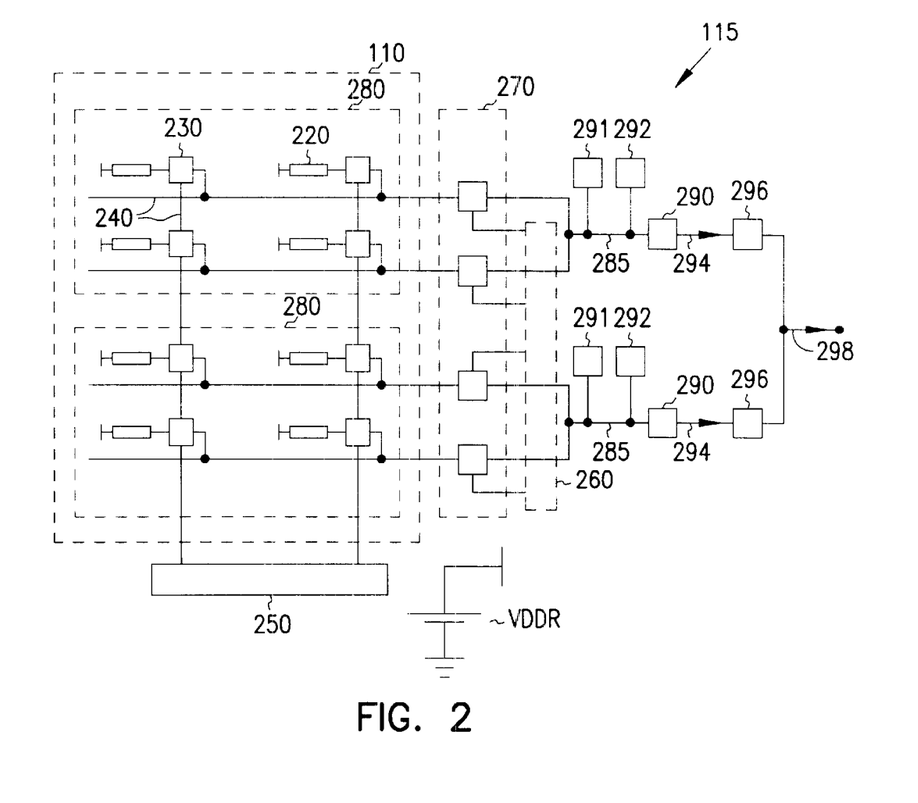
FIG. 2 illustrates a typical ROIC circuit including multiple smaller arrays to ease the readout process.

FIG. 2 illustrates one example embodiment of a ROIC 115 used in forming the microbolometer array 110 including two smaller arrays 280. Each microbolometer in the array 110 is represented as an electrical resistor 220. Associated with each microbolometer 220 in the array 110 is a field-effect transistor (FET) 230. The microbolometers 220 and the FETs 230 are interconnected as shown in FIG. 2 by thin-film metallic conductors 240. The ROIC 115 further includes column and row shift registers 250 and 260. The column shift register 250 applies control voltages to columns of the array 110, and the shift register 260 applies control voltages to a row multiplexer 270. A global bias voltage VDDR is applied to all the microbolometers in the array 110. The two output signal lines 285 associated with each of the two smaller arrays 280 are held at zero volts by two measurement circuits 290.

In operation, the ROIC 115 typically applies control voltages so that only one microbolometer in each of the two smaller arrays 280 has an applied VDDR across it, and a signal current flows along the corresponding thin-film row metallic conductor 240, through the multiplexer 270, and out to the associated output signal lines 285. Additional current is supplied from current sources 291 associated with each of the multiple smaller arrays 280 to bring the net output current substantially close to zero. The current sources 291 can apply different bias current values for different microbolometers 220 in the array 110 during each time interval the microbolometers 220 are being biased, so that the output current remains close to zero even if the resistance of different microbolometers have slightly different resistance values, due to small fabrication variations between different microbolometers 220 in the array 110.

The signal zeroing process called "coarse non-uniformity correction" together with other methods and apparatus to correct for coarse non-uniformity are taught in U.S. Pat. No. 4,752,694. The output signals 294 are input into associated integrators and A/D converters 296 to convert the signals 294 to a digital signal value 298. Calibration circuits 292 for applying calibration bias pulses are coupled to the two measurement circuits 290, so that the respective output signals also include calibration signals to correct for unwanted drifts in the respective integrators and A/D converters 296.

Figure 3:
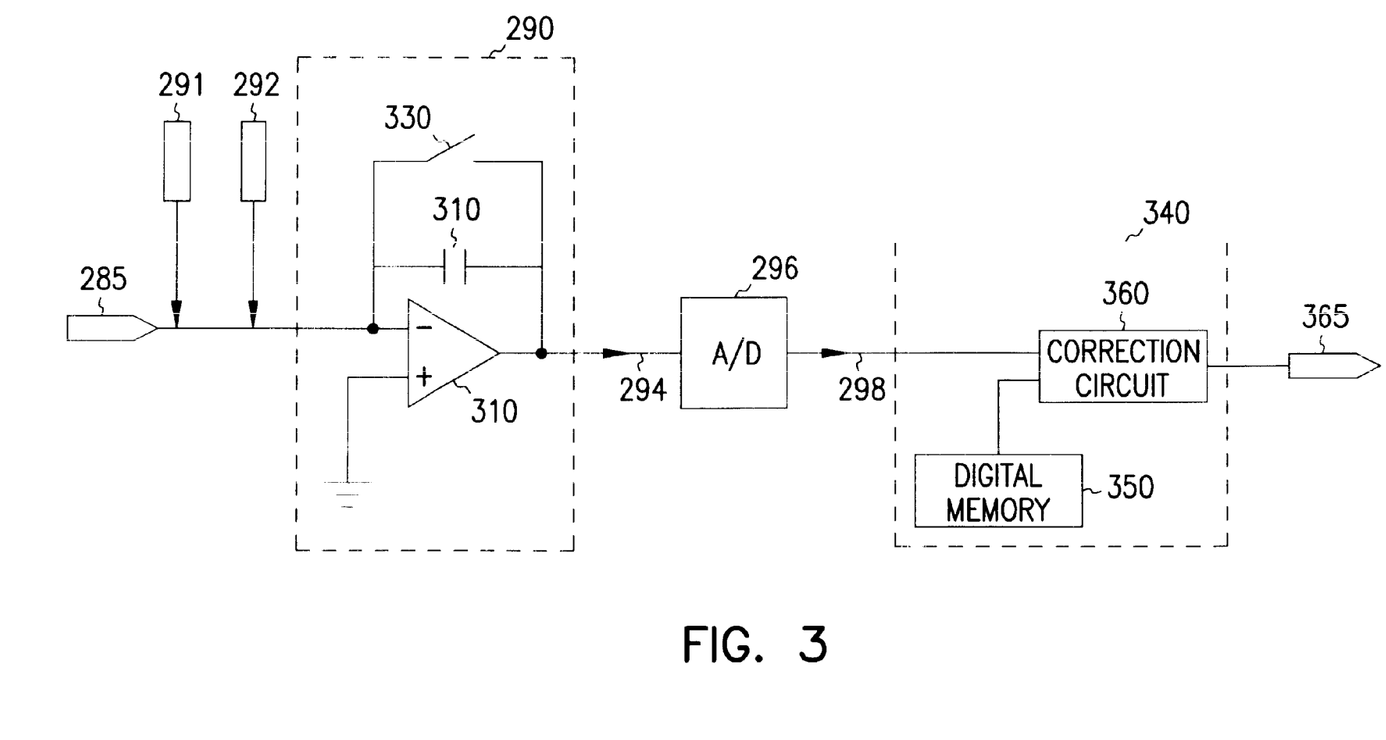
FIG. 3 illustrates a typical readout circuit including an integrator and an A/D converter used to convert an output signal to a digital signal value from each of the multiple smaller arrays.

FIG. 3 illustrates a typical measurement circuit 290 coupled to a digital signal processor 340. The output signals 285 are integrated using a capacitor 320 and an amplifier 310 until discharged by a switch 330 during a frame time. The signal 294 is converted to a digital signal value 298 using the A/D converter 296. A digital signal processor 340 includes a digital memory 350, and a correction circuit 360. The digital memory 350 holds correction values for each microbolometer in the respective smaller array 280. The correction circuit 360 generates the final output signal 365 using the digital signal value 298 and the associated correction value stored in the digital memory 350. The corrections are typically "fine offset corrections", which generally removes small zero-error signals. The corrections can also include "gain correction," which correct for differing sensitivities between different microbolometers 220 in the array 110. The corrections can further include "dead pixel replacement," which is a replacement of signals from poorly operating microbolometers in the array 110 with signal values derived from neighboring microbolometers. Corrections can also include corrections for contrast, brightness, and/or pseudocolor to produce an image that can more readily be perceived by an observer.

Figure 4:
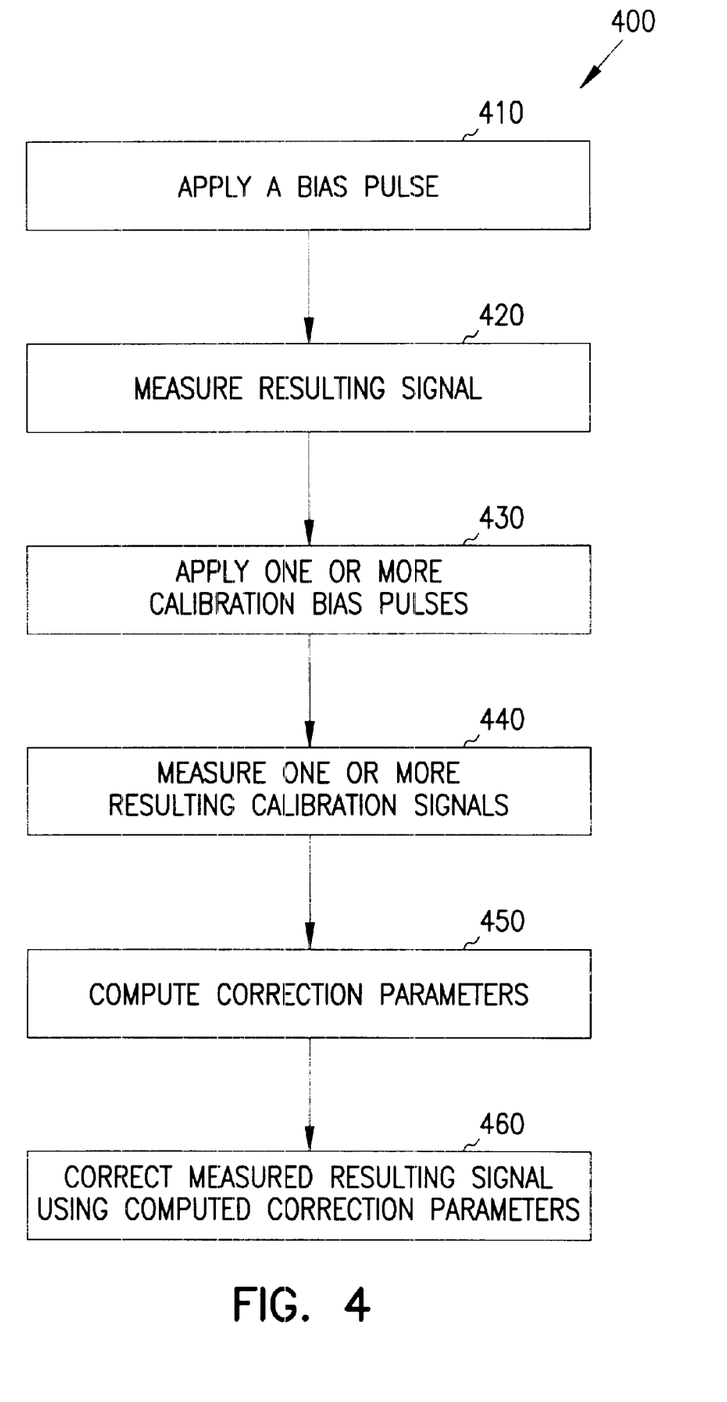
FIG. 4 illustrates a method of reducing undesirable artifacts produced when using multiple smaller arrays having their own readout circuitry.

FIG. 4 illustrates an overview of one embodiment of the process 400 of the present invention. As illustrated in step 410, this process applies a separate bias pulse during a frame time to each of the microbolometers in a microbolometer array divided into multiple smaller arrays. The frame time is the time it takes for the array to produce one complete image of an object being viewed by the array. The bias pulse can be a voltage bias pulse. The bias pulse can have time duration of approximately in the range of about 0.1 to 20 microseconds. In some embodiments, applying the bias pulse can include applying multiple bias pulses so that they are substantially sequential and substantially equal in magnitude during the frame time. The multiple bias pulses can be in the range of about 2 to 100 bias pulses.

Step 420 measures a resulting signal corresponding to the applied bias pulse during the frame time for each of the microbolometers in the smaller arrays using measurement circuitry associated with each of the smaller arrays. In some embodiments, the resulting signal is a current signal. Step 430 applies one or more calibration bias pulses during the frame time to each of the measurement circuitry associated with the smaller arrays. Step 440 measures one or more resulting calibration signals corresponding to the applied calibration bias pulses during the frame time. Step 450 computes correction parameters for each of the smaller arrays based on each of the associated measured resulting calibration signals. In some embodiments, correction parameters can be offset voltage, offset current, and/or gain correction. Step 460 corrects the measured resulting signal using each of the associated computed correction parameters to produce an output signal that has a substantially reduced undesirable deficiencies in the produced image between the smaller arrays. The process 400 includes repeating the above steps each frame time to reduce undesirable deficiencies in the produced image by each of the smaller arrays including its own measurement circuitry.

In some embodiments, the process 400 can further include applying a corrective signal to each output signal to correct for resistance non-uniformity between the microbolometers in each of the smaller arrays to obtain a substantially more uniform output signal. In some embodiments, the substantially more uniform output signal associated with each of the microbolometers in the array is converted to a digital signal value. In some embodiments, the process 400 can also include passing each of the digital signal values associated with each of the microbolometers in the array through a digital image processor to correct for image defects. In some embodiments, image defects can include offsets, deficiencies, pattern noise, gain non-uniformities, and/or dead pixels.

Figure 5:
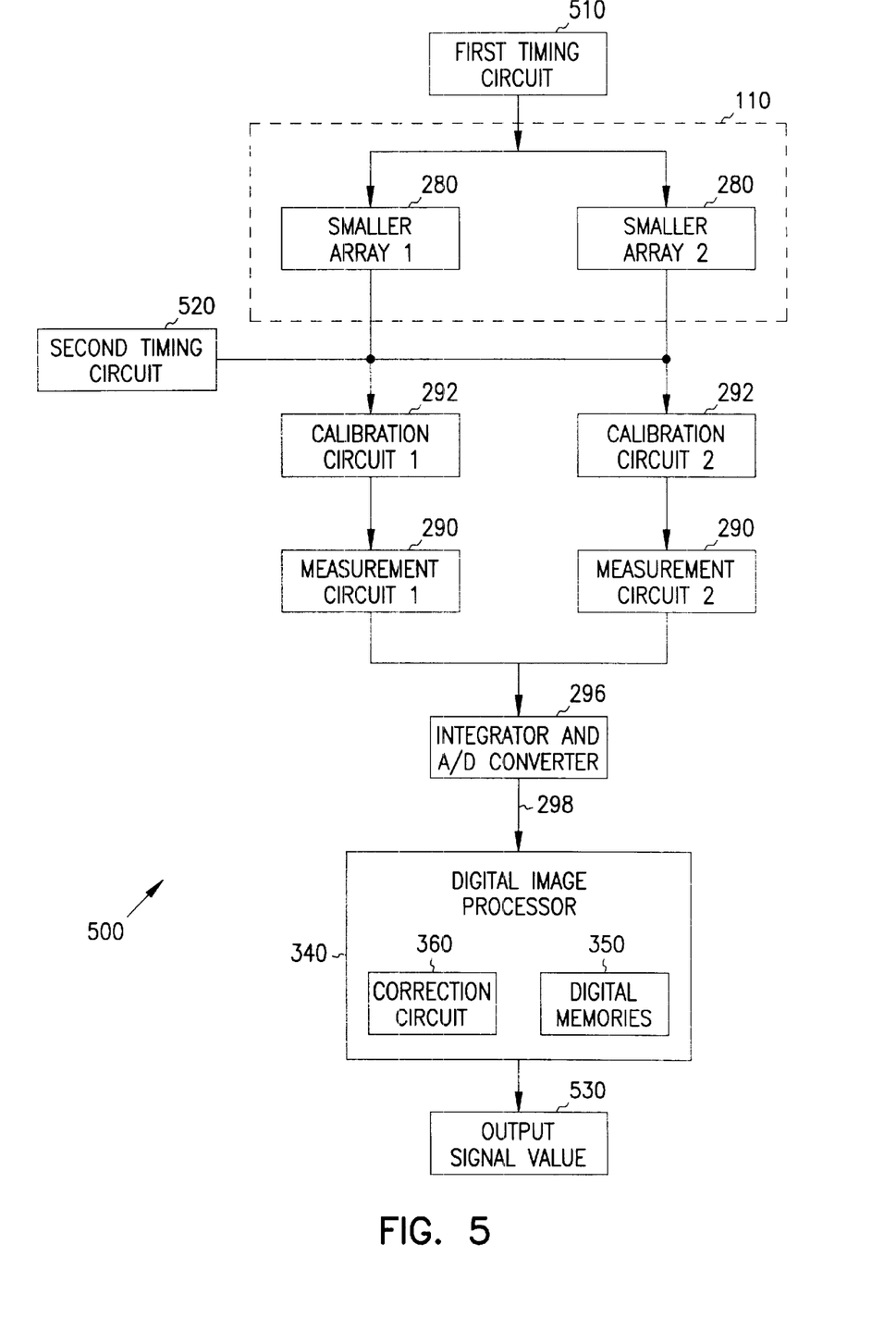
FIG. 5 illustrates major components of an infrared radiation detector apparatus and their interconnections according to the present invention.

FIG. 5 illustrates major portions of an infrared radiation detector apparatus 500 and their interconnections according to the present invention. The infrared radiation detector apparatus 500 includes a microbolometer array 10. The microbolometer array 110 is further divided into multiple smaller arrays 280. In the example embodiment shown in FIG. 5 the microbolometer array 110 is divided into two smaller arrays. The apparatus 500 further includes first and second timing circuits 510 and 520, respectively. The apparatus 500 further includes multiple calibration and measurement circuits 292 and 290, respectively corresponding to each of the smaller arrays 280. The first timing circuit is coupled to the array 110. The second timing circuit 520 is coupled to each of the calibration circuits 292. Further, the apparatus 500 includes an integrator and an A/d converter 296, and a digital image processor 340. The digital image processor 340 further includes a correction circuit 360, and digital memories 350.

In operation, the first timing circuit 510 applies a bias pulse to each of the microbolometers in the smaller arrays 280 during a frame time. In some embodiments, the bias pulse can include multiple bias pulses that are substantially equal in magnitude. The multiple bias pulses can also be applied such that they are substantially equally spaced in time. In some embodiments, the bias pulse is a voltage bias pulse. The bias pulse can have a time duration of 1 to 100 microseconds. The frame time is the time it takes for the array 110 to produce a complete image of an object being viewed by the array 110.

The multiple measurement circuits 290 measure resulting signals associated with each of the applied bias pulses during the frame time. In some embodiments, the resulting signals can be current signals. The second timing circuit 520 applies one or more bias calibration bias pulses during the frame time to each of the measurement circuits 290. Then the measurement circuits 290 measure one or more resulting calibration signals corresponding to the applied one or more calibration bias pulses. Then the measurement circuits 290 compute correction parameters for each of the smaller arrays based on each of the measured one or more resulting calibration signals. Further, the measurement circuits 290 apply each of the computed correction parameters to the measured resulting signal to produce an output signal that reduces undesirable deficiencies in an image produced by the microbolometer array including multiple smaller arrays 280. The correction parameters can be an offset voltage, an offset current, and/or a gain correction.

In some embodiments, the integrator and A/D converter 296 convert the output signal to a digital signal value for each of the microbolometers in the smaller arrays 280. In some embodiments, the digital image processor 340 including the correction circuit 360 receives the digital signal value associated with each of the microbolometers in the smaller arrays 280 and corrects for image defects such as offsets, gain non-uniformities, and/or dead pixels. In some embodiments, the correction circuit 360 further applies a corrective electrical signal to correct for any resistance non-uniformity present in each of the microbolometers in the smaller arrays 280 to obtain a substantially uniform output signal value. The corrective electrical signals associated with each of the microbolometers in the array 110 are stored in the digital memories 350.

Conclusion

The above-described method and apparatus provides reduced undesirable deficiencies in an image produced by a microbolometer array divided into multiple smaller arrays including their own measurement circuits.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A method for reading out a large microbolometer array having multiple groups of microbolometers comprising:
   using multiple measuring circuits to readout each of the groups of the microbolometers; and
   wherein:
      the multiple groups of microbolometers are small arrays;
      each column of each small array has fewer microbolometers than a column of the large microbolometer array; and
      each row of said each small array has fewer microbolometers than that of a row of the large microbolometer array.

2. The method of claim 1, further comprising:
   applying a corrective electrical signal to each group output signal to correct for resistance non-uniformity between the microbolometers in each of the groups of microbolometers to obtain a substantially more uniform output signal.

3. The method of claim 1, further comprising:
   converting the substantially more uniform output signal associated with each of the microbolometers in the array to a digital signal value.

4. The method of claim 3, further comprising:
   passing each of the digital signal values associated with respective microbolometers in the array through a digital image processor to correct for image defects.

5. The method of claim 4, wherein the image defects comprise:
   offsets, deficiencies, gain non-uniformities, and/or dead pixels.

6. A method for reducing an undesirable pattern noise in an image produced by a large microbolometer array including multiple groups of microbolometers, comprising:
   applying a bias pulse during a frame time to each of the microbolometers in the groups of microbolometers;
   measuring a first resulting signal corresponding to the applied bias pulse during the frame time for each of the microbolometers in the groups of microbolometers using multiple measuring circuitry associated with each of the groups of microbolometers;
   applying one or more calibration bias pulses during the frame time to the measuring circuitry associated with each of the groups of microbolometers;
   measuring one or more second resulting signals corresponding to the applied calibration bias pulses during the frame time;
   computing correction parameters for each of the groups of microbolometers based on each of the associated measured one or more second resulting signals; and
   correcting the measured first resulting signal using each of the associated computed correction parameters to produce an output signal that substantially reduces undesirable image defects in the produced image; and
   wherein:
      the multiple groups of microbolometers are small arrays;
      each column of each small array has fewer microbolometers than a column of the large microbolometer array; and
      each row of said each small array has fewer microbolometers than a row of the large microbolometer array.

7. The method of claim 6, further comprising:
   repeating the applying, measuring, computing, and correcting steps continuously to compute the output signal corresponding to each microbolometer in the groups of microbolometers during each frame time to reduce the undesirable image defects in the produced image by the groups of microbolometers.

8. The method of claim 6, further comprising:
   applying a corrective electrical signal to each output signal to correct for resistance non-uniformity between the one or more microbolometers in the large array to obtain a substantially more uniform output signal value.

9. The method of claim 6, further comprising:
   converting the uniform output signal value associated with each of the microbolometers in the large array to a digital signal value.

10. The method of claim 9, further comprising:
    passing each of the digital signal values associated with each of the microbolometers in the large array through a digital image processor to correct for image defects.

11. The method of claim 10, wherein the image defects comprise:
    offsets, pattern noise, gain non-uniformities, and/or dead pixels.

12. The method of claim 6, wherein applying the bias pulse comprises:
    applying multiple bias pulses so that they are substantially sequential and substantially equal in magnitude during the frame time.

13. The method of claim 6, wherein the bias pulse comprises:
    a voltage bias pulse.

14. The method of claim 6, wherein the first resulting signal comprises:
    a current signal.

15. The method of claim 6, wherein the bias pulse has a time duration of approximately in the range of about 0.1 to 20 microseconds.

16. The method of claim 6, wherein the frame time is the time it takes for the large array to produce a complete image of an object being viewed by the large array.

17. The method of claim 6, wherein the offset parameters comprise:
    offset voltage, offset current, and/or gain correction.

18. A method for reducing undesirable deficiencies in an image produced by a large microbolometer array divided into multiple smaller arrays comprises:

applying a separate bias pulse during a frame time to each of the microbolometers in the smaller arrays;

measuring a first resulting signal corresponding to the applied bias pulse during the frame time for each of the microbolometers in the smaller arrays multiple measurement circuitry associated with each of the smaller arrays;

applying one or more calibration bias pulses during the frame time to the measurement circuitry associated with each of the smaller arrays;

measuring one or more second resulting signals corresponding to the applied calibration bias pulses during the frame time;

computing correction parameters for each of the smaller arrays based on each of the associated measured second resulting signals; and correcting the measured first resulting signal using each of the associated computed correction parameters to produce an output signal that substantially reduces undesireable deficiencies in the produced image between the smaller arrays; and wherein:
each column of each smaller array has fewer microbolometers than a column of the large microbolometer array; and
each row of said each smaller array has fewer microbolometers than a row of the large microbolometer array.

19. The method of claim 18, further comprising:
repeating the applying, measuring, computing, and correcting steps continuously to compute the output signal corresponding to each microbolometer in the multiple smaller arrays during each frame time to reduce the undesirable deficiencies in the produced image by the multiple smaller arrays.

20. The method of claim 18, further comprising:
applying a corrective electrical signal to each smaller array output signal to correct for resistance non-uniformity between the microbolometers in each of the smaller arrays to obtain a substantially more uniform output signal.

21. The method of claim 18, further comprising:
converting the substantially more uniform output signal associated with each of the microbolometers in the smaller array to a digital signal value.

22. The method of claim 21, further comprising:
passing each of the digital signal values associated with respective microbolometers in the smaller array through a digital image processor to correct for image defects.

23. The method of claim 22, wherein the image defects comprise:
offsets, deficiencies, gain non-uniformities, and/or dead pixels.

24. The method of claim 18, wherein applying the bias pulse comprises:
applying multiple bias pulses so that they are substantially sequential and substantially equal in magnitude during the frame time.

25. The method of claim 18, wherein the bias pulse comprises:
a voltage bias pulse.

26. The method of claim 18, wherein the first resulting signal comprises:
a current signal.

27. The method of claim 18, wherein the bias pulse has a time duration in the range of about 0.1 to 20 microseconds.

28. The method of claim 18, wherein the frame time is the time it takes for the large array to produce a complete image of an object being viewed by the large array.

29. The method of claim 18, wherein the offset parameters comprise:
offset voltage, offset current, and/or gain correction.

30. An infrared radiation detector apparatus, comprising:
a large microbolometer array including multiple smaller microbolometer arrays;

a first timing circuit coupled to the large array to apply a bias pulse to each of the microbolometers in the smaller arrays during a frame time;

multiple measurement circuits coupled to the corresponding smaller arrays to measure first resulting signals associated with each of the applied bias pulses during the frame time;

multiple calibration circuits coupled to the corresponding measurement circuits; and a second timing circuit coupled to the calibration circuits to apply one or more calibration bias pulses during the frame time to each of the measurement circuits, wherein the measurement circuits measure one or more second resulting signals corresponding to the applied one or more calibration bias pulses;

wherein the measurement circuits compute correction parameters for each of the smaller arrays based on each of the measured one or more second resulting signals; and the measurement circuits further apply each of the computed correction parameters to the measured first resulting signal to produce an output signal that reduces undesireable deficiencies in an image produced by the large microbolometer array including multiple smaller arrays; and wherein:
each column of each smaller array has fewer microbolometers than a column of the large microbolometer array; and
each row of said each smaller array has fewer microbolometers than a row of the large microbolometer array.

31. The apparatus of claim 30, further comprising:
an integrator and an A/D converter to convert the output signal to a digital signal value for each of the microbolometers in the smaller arrays.

32. The apparatus of claim 31, further comprising:
a digital image processor including a correction circuit coupled to the A/D converter to receive the digital signal value associated with each of the microbolometers in the smaller arrays, and correct for image defects such as offsets, gain non-uniformities, and/or dead pixels.

33. The apparatus of claim 32, wherein the digital image processor further comprises:
a correction circuit to apply a corrective electrical signal based on a correction value to the output signal to correct for any resistance non-uniformity in each of the microbolometers of the smaller arrays to a obtain a substantially uniform output signal value.

34. The apparatus of claim 33, wherein the digital image processor further comprises:
digital memories to store corrective electrical signals associated with each of the microbolometers in the smaller arrays.

35. The apparatus of claim 30, wherein the bias pulse comprises multiple bias pulses that are substantially equal in magnitude.

36. The apparatus of claim 35, wherein the multiple bias pulses are substantially equally spaced in time.

37. The apparatus of claim 30, wherein the bias pulse is a voltage bias pulse.

38. The apparatus of claim 30, wherein the first resulting signals are current signals.

39. The apparatus of claim 30, wherein the bias pulse has a time duration of approximately in the range of about 0.1 to 20 microseconds.

40. The apparatus of claim 30, wherein the frame time is the time it takes for the large array to produce a complete image of an object being viewed by the large array.

41. The apparatus of claim 30, wherein the correction parameters comprise:
offset voltage, offset current, and/or gain correction.

42. An infrared radiation detector apparatus, comprising:
a large microbolometer array including multiple groups of microbolometers;
a first timing circuit coupled to the large array to apply a bias pulse to each of the microbolometers in the groups of microbolometers during a frame time;
multiple measuring circuits, coupled to the corresponding multiple groups of microbolometers to measure first resulting signals associated with each of the applied bias pulses during the frame time;
multiple calibration circuits, coupled to the corresponding multiple measuring circuits;
a second timing circuit coupled to the multiple calibration circuits to apply one or more calibration bias pulses during the frame time to each of the multiple measuring circuits, wherein the multiple measuring circuits produce one or more second resulting signals corresponding to the applied one or more known bias pulses; and
a computing circuit, coupled to the multiple measuring circuits, to compute offset and gain parameters, and apply the computed offset and gain parameters to the measured first resulting signals associated with each of the multiple measuring circuits to produce an output signal that reduces undesirable pattern noise in an image produced by the large microbolometer array including the groups of microbolometers; and
wherein:
the multiple groups of microbolometers are small arrays;
each column of each small array has fewer microbolometers than a column of the large microbolometer array; and
each row of said each small array has fewer microbolometers than a row of the large microbolometer array.

43. The apparatus of claim 42, further comprising:
an integrator and an A/D converter to convert the output signal to a digital signal value for each of the microbolometers in the small arrays.

44. The apparatus of claim 43, further comprising:
a digital image processor including a correction circuit coupled to the A/D converter to receive the digital signal value associated with each of the microbolometers in the groups of microbolometers, and correct for image defects such as offsets, pattern noise, gain non-uniformities, and/or dead pixels.

45. The apparatus of claim 44, wherein the digital image processor further comprises:
correction and memory circuits to apply the computed offset and gain parameters to the output signal to correct for any resistance non-uniformity in each of the microbolometers of the small arrays to obtain a substantially uniform output signal value.

46. The apparatus of claim 42, wherein the bias pulse comprises multiple bias pulses that are substantially equal in magnitude.

47. The apparatus of claim 42, wherein the multiple bias pulses are substantially equally space in time.

48. The apparatus of claim 42, wherein the bias pulse is a voltage bias pulse.

49. The apparatus of claim 42, wherein the first resulting signals are current signals.

50. The apparatus of claim 42, wherein the bias pulse has a time duration of approximately in the range of about 0.1 to 20 microseconds.

51. A method for reading out a large array of microbolometers comprising:
dividing the large array of microbolometers into a plurality of small arrays of microbolometers; and
reading out each small array of the plurality of small arrays of microbolometers; and
replacing output signals from any poorly operating microbolometer with signals derived from neighboring microbolometers; and
wherein:
each column of each small array of said plurality of small arrays has fewer microbolometers than a column of the large array; and
each row of said each small array of said plurality of small arrays has fewer microbolometers than a row of the large array.

52. The method of claim 51, further comprising correcting output signals from each microbolometer due to resistance non-uniformity of each microbolometer relative to resistances of other microbolometers.

53. A detector system comprising:
a plurality of small arrays of microbolometers forming a large array of microbolometers;
a calibration circuit connected to each of said plurality of small arrays;
a measurement circuit connected to each of said calibration circuits;
an analog-to-digital converter connected to said measurement circuits; and
a correction circuit connected to said analog to digital converter; and
wherein:
said correction circuit comprises a dead pixel replacement circuit that replaces signals from poorly operating microbolometers with signals derived from neighboring microbolometers;
each column of each small array of said plurality of small arrays has fewer microbolometers than a column of the large array; and
each row of said each small array of said plurality of small arrays has fewer microbolometers than a row of the large array.

54. A detector system comprising:
a plurality of small arrays of microbolometers forming a large array of microbolometers; and
a correction circuit coupled to said plurality of small arrays; and
wherein:
said correction circuit comprises a poor pixel replacement circuit that replaces signals from poorly operating microbolometers with signals derived from neighboring microbolometers;
each column of each small array has fewer microbolometers than a column of the large microbolometer array; and
each row of said each small array has fewer microbolometers than that of a row of the large microbolometer array.

* * * * *